Patented June 11, 1946

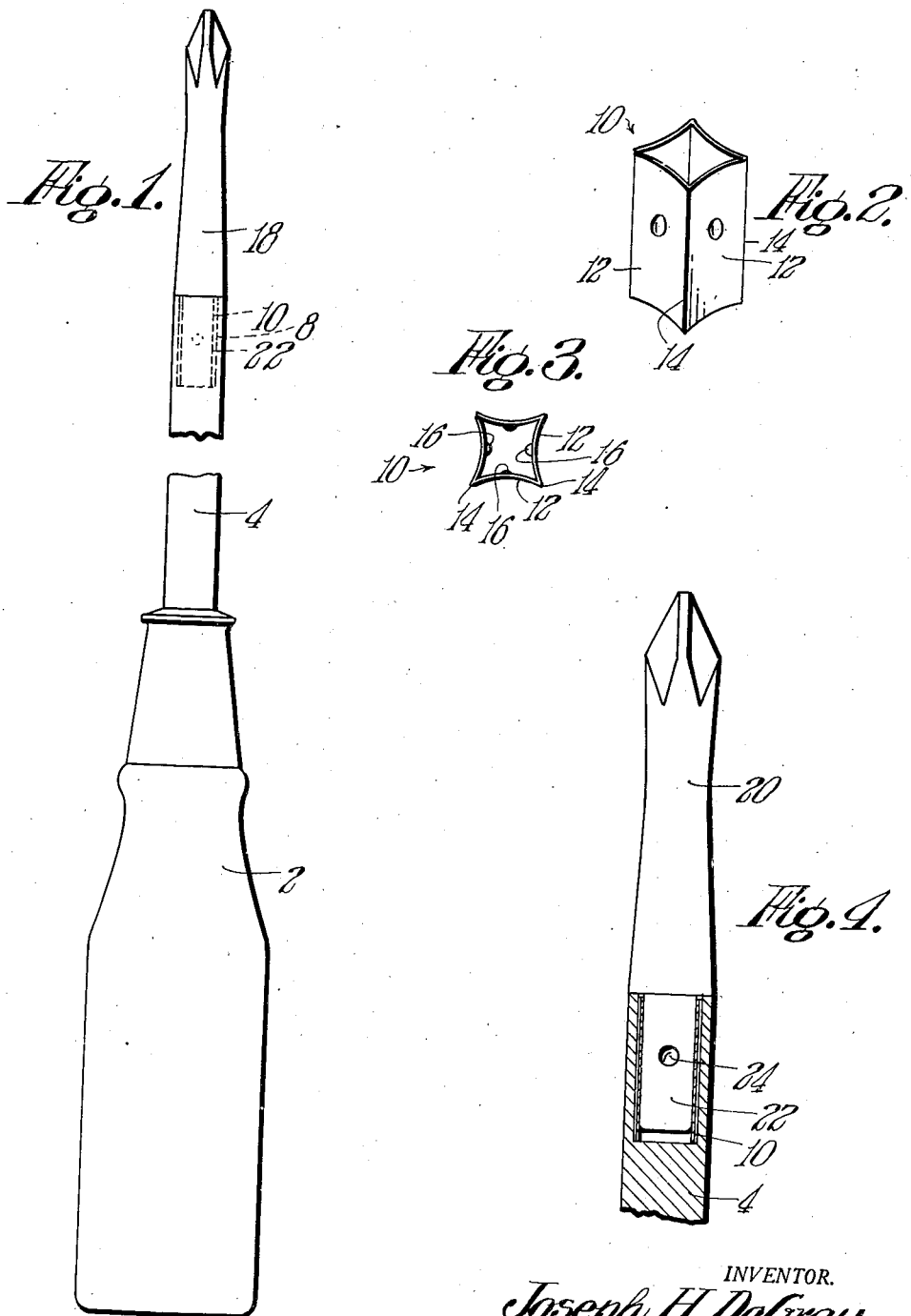

2,401,816

UNITED STATES PATENT OFFICE 2,401,816

SCREW DRIVER CONSTRUCTION

Joseph H. De Gray, Springfield, Mass.

Application March 20, 1944, Serial No. 527,168

1 Claim. (Cl. 279—102)

This invention relates to improvements in tools and is directed more particularly to improvements in screw drivers.

The principal objects of the invention are directed to the provision of a screw driver construction wherein a plurality of screw engaging members are provided that may be easily and readily inserted in the shank of a handle whereby a plurality of screw engaging members may be used with a single handle.

According to the novel features of the invention, the shank of the screw driver is provided with a socket in which is disposed a spring member of novel form that is adapted to yieldingly engage a part of the screw driving member.

Various novel features and objects of the invention will be hereinafter more fully referred to in connection with the accompanying description of the invention in the form at present preferred.

In the drawing:

Fig. 1 is a side elevational view of a screw driver embodying the novel features of the invention;

Fig. 2 is a perspective view of the retainer means of the invention;

Fig. 3 is a plan view of the retainer shown in Fig. 2; and

Fig. 4 is a sectional elevational view through the outer end of the screw driver.

Referring now to the drawing in detail, the invention will now be described in detail.

A handle is represented by 2 which has a shank 4 extending therefrom. The outer end of the shank is provided with a socket 8 in which is disposed means 10 for engaging a screw engaging member.

The retaining means 10 preferably includes a spring-like member that may be formed from relatively thin spring-like metal to provide side wall parts 12 that are preferably bowed inwardly so as to be slightly yieldable. The spring is formed so that its longitudinal corners 14 fit snugly in the corners of the square socket in the end of the shank.

Indentations are formed in the sides of the spring 10 so as to provide inwardly extending projections 16 on the inner sides of the spring walls 12.

Screw engaging members 18 and 20 may take any form desired and there may be any number of them. Each will be provided with a square shank on its lower end that is receivable in the spring 10.

The shank of each screw engaging member will be provided with a recess 24, see Fig. 4, in which a projection 16 is receivable.

One or any number of the walls of the spring retainer may be provided with projections such as 16 and recesses may be provided on one or more sides of the shank of the screw engaging member.

The shank of a screw engaging member is inserted into the spring member and the parts are so arranged that the sides of the spring member yield slightly and yieldingly grip the shank with the projection on the spring member entering the recess of the shank.

In this way a screw driving member is easily and readily inserted in the shank 4 and may as readily be withdrawn, yet while the screw engaging member is associated with the shank and handle the connection is such that the screw engaging member becomes a part of the shank.

It will be noted that the body of the screw engaging member is larger than the shank to provide a shoulder around the shank This is desirable as it bears on the end of the screw driver shank to take pressure applied to the screw engaging member.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A screw driver construction comprising in combination, a handle having a shank extending therefrom provided with a free end, said free end provided with an axially disposed square socket having side walls and a bottom, a retainer disposed in said socket formed from relatively thin spring-like material to have a wall extending along each wall of the socket to the bottom thereof, the walls of the retainer being bowed inwardly centrally thereof from longitudinal side edges thereof throughout the length thereof so as to be yieldable outwardly towards the adjacent wall of the socket, and a screw engaging member having a square shank for insertion into said retainer arranged whereby the faces of the shank bear on and cause the walls of the retainer to yield outwardly so that said shank is frictionally and yieldingly embraced substantially throughout the depth of the socket, each wall of the retainer provided with inwardly extending projections and each side of said shank provided with a recess for receiving said projection as said shank is gripped by said retainer walls.

JOSEPH H. DE GRAY.